(12) United States Patent
Wang

(10) Patent No.: US 10,369,934 B2
(45) Date of Patent: Aug. 6, 2019

(54) LUGGAGE TRAY

(71) Applicant: Chiu Kuei Wang, Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/713,331

(22) Filed: Sep. 22, 2017

(65) Prior Publication Data

US 2018/0093616 A1 Apr. 5, 2018

(30) Foreign Application Priority Data

Sep. 30, 2016 (TW) .............................. 105214903 U

(51) Int. Cl.
*B60R 9/00* (2006.01)
*B60R 9/045* (2006.01)

(52) U.S. Cl.
CPC .................................. *B60R 9/045* (2013.01)

(58) Field of Classification Search
CPC ..................................................... B60R 9/045
USPC ........................................................ 224/321
See application file for complete search history.

(56) References Cited

U.S. PATENT DOCUMENTS

| | | | | |
|---|---|---|---|---|
| 2,639,848 A * | 5/1953 | Burmeister | ............. | B60R 9/058 224/325 |
| 3,221,960 A * | 12/1965 | Gleason | .................... | B60R 9/04 224/326 |
| 3,696,979 A * | 10/1972 | Erickson | ................. | B60K 15/06 220/483 |
| 4,277,008 A * | 7/1981 | McCleary | .............. | B62K 27/12 224/401 |
| 4,406,387 A * | 9/1983 | Rasor | ...................... | B60R 9/055 220/4.22 |
| 6,068,168 A * | 5/2000 | Kreisler | .................... | B60R 9/00 224/309 |
| 6,425,508 B1 * | 7/2002 | Cole | ........................ | B60R 9/045 224/320 |
| 6,581,813 B2 * | 6/2003 | Bove | ....................... | B60R 9/055 224/324 |
| 7,011,239 B2 * | 3/2006 | Williams | ................ | B60R 9/042 224/310 |
| 2004/0232182 A1 * | 11/2004 | Ingram | ..................... | B60R 7/14 224/401 |
| 2004/0238580 A1 * | 12/2004 | Bruner | ...................... | B60R 9/00 224/324 |
| 2005/0082326 A1 * | 4/2005 | Badillo | ..................... | B60R 9/00 224/326 |
| 2008/0272164 A1 * | 11/2008 | Wang | ....................... | B60R 9/045 224/330 |
| 2008/0283564 A1 * | 11/2008 | Dinsmore | ................ | B60R 9/00 224/319 |
| 2008/0302843 A1 * | 12/2008 | Mogami | ................... | B60R 5/04 224/539 |

* cited by examiner

*Primary Examiner* — Peter N Helvey

(74) *Attorney, Agent, or Firm* — Che-Yang Chen; Law Offices of Scott Warmuth

(57) ABSTRACT

A luggage tray includes a first part and a second part which is connected to the first part by multiple connectors. Each of the first and second parts has a net portion. The tubes of the first and second parts are connected to extension tubes at the connectors. An intermediate portion can be connected between the first and second parts by more connectors to expand the size of the luggage tray.

4 Claims, 6 Drawing Sheets

LUGGAGE TRAY

BACKGROUND OF THE INVENTION

1. Fields of the Invention

The present invention relates to a luggage tray installed on top of vehicles, and more particularly, to a luggage tray that is extendable as needed.

2. Descriptions of Related Art

The conventional luggage trays are installed on top of vehicles and convenient for carrying large items or luggage. The conventional luggage trays are bulky can have only a fixed size. The bulky luggage trays are difficult to be transported and occupy a lot of space.

The present invention intends to provide a luggage tray that is easily assembled and dis-assembled to meet different needs.

SUMMARY OF THE INVENTION

The present invention relates to a luggage tray and comprises a first part having a first top tube and a first bottom tube. Each of the first top tube and the first bottom tube is a U-shaped tube, and the first top tube and the first bottom tube are connected to each other by two connectors. The first bottom tube has a first net portion connected thereto. Each connector has passages defined in two ends thereof, and the first top tube and the first bottom tube are inserted into the passages. Two first extension tubes are respectively inserted into the two passages of each of the connectors and are respectively connected to the first top tube and the first bottom tube corresponding thereto.

A second part has a second top tube and a second bottom tube, and each of the second top tube and the second bottom tube is a U-shaped tube. The second top tube and the second bottom tube are connected to each other by two connectors. The second bottom tube has a second net portion connected thereto. Each of the connectors has a passage defined in each of two ends thereof. The second top tube and the second bottom tube are inserted into the passages of each of the connectors of the second part. Two second extension tubes are inserted into the two passages of each of the two connectors of the second part and are respectively connected to the second top tube and the second bottom tube corresponding thereto.

The first part and the second part are connected to each other by connecting the respective first and second extension tubes to each other at the two connectors that are located between the first part and the second part.

Preferably, the first extension tubes are respectively connected to the first top tube and the first bottom tube in the connector of the first part by extending a bolt through the connector and first extension tubes and the first top/bottom tube.

Preferably, each of the connectors includes a resilient member which is located between the first/second extension tubes and the inside of the connector to combine the at least one connector and the first/second extension tubes together.

Preferably, each of the first and second extension tubes has a first/second decorative member connected thereto.

Preferably, the first net portion of the first part includes an upward inclined section.

Preferably, an intermediate portion is connected between the first and second parts by more connectors to expand the size of the luggage tray.

The primary object of the present invention is to provide a luggage tray which can be expanded in size by using the intermediate portion.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
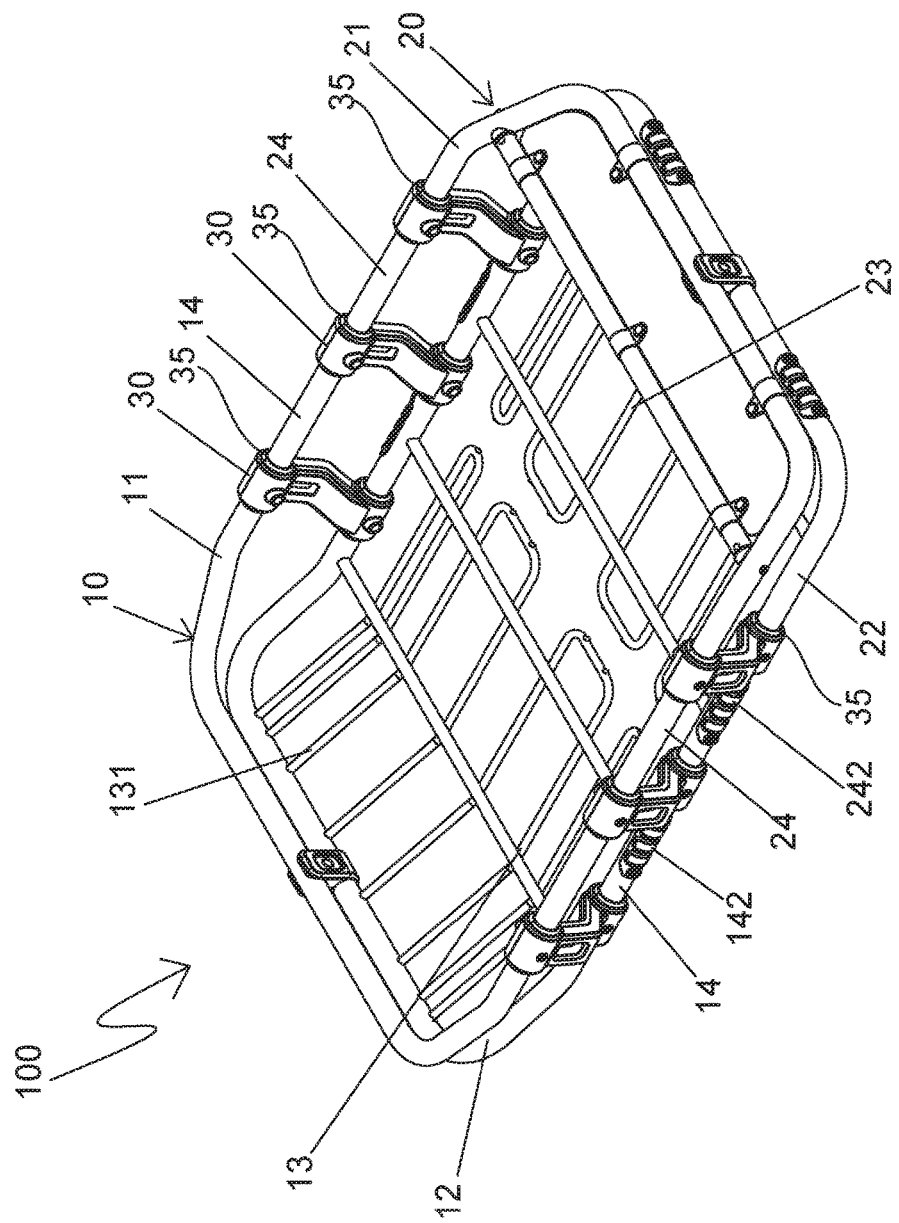
FIG. 1 is a perspective view to show the luggage tray of the present invention.
Figure 2:
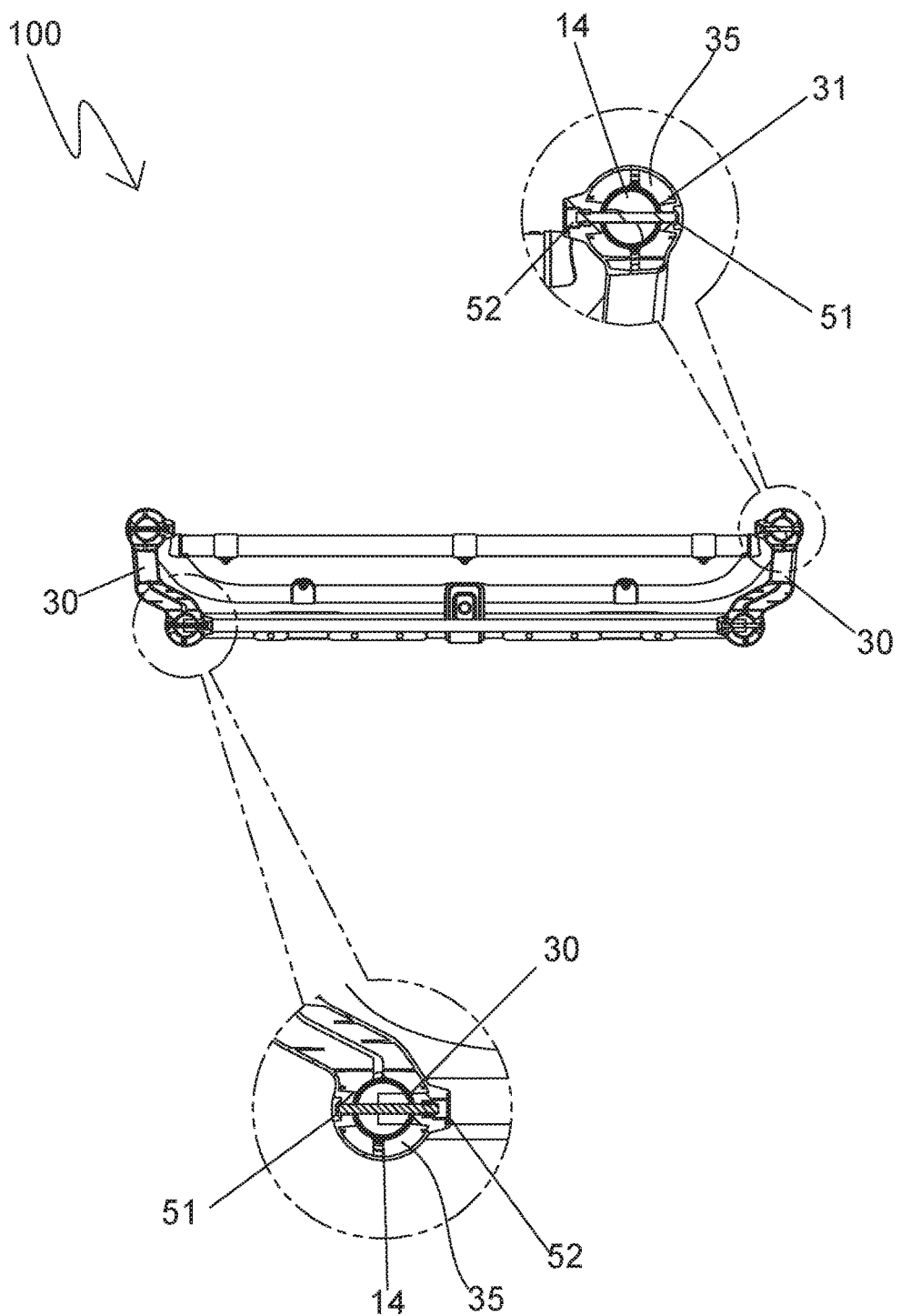
FIG. 2 shows the connection between the connector, the resilient member, the first extension tube, and the bolt.
Figure 3:
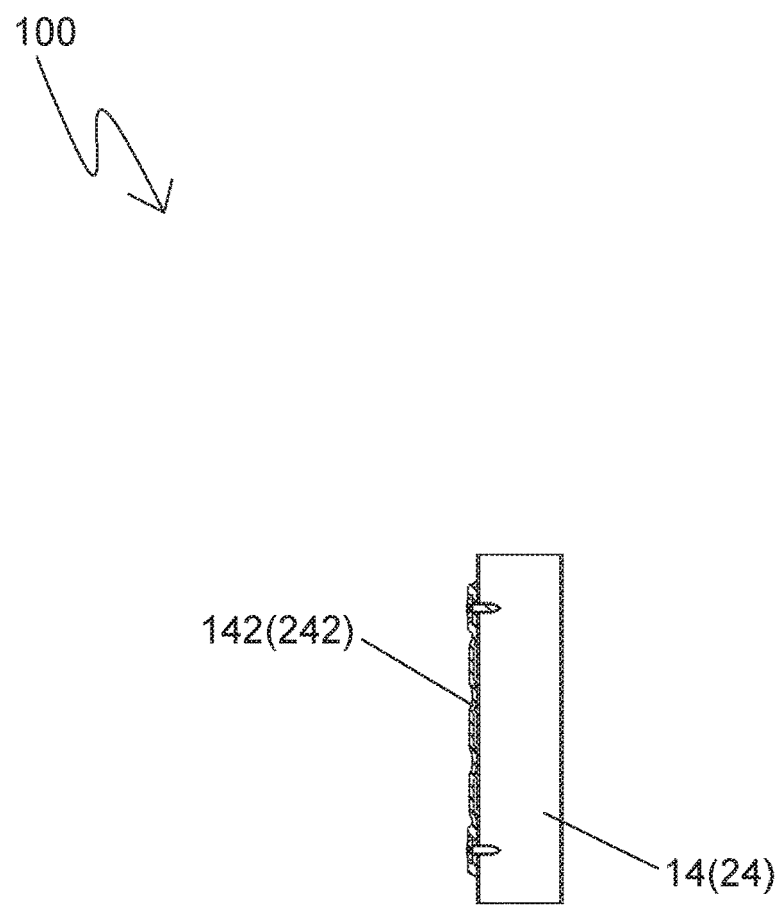
FIG. 3 shows that the decorative member on the extension tube.

Referring to FIGS. 1 to 3, the first embodiment 100 of the luggage tray of the present invention comprises a first part 10 having a U-shaped first top tube 11 and a U-shaped first bottom tube 12. The first top tube 11 and the first bottom tube 12 are connected to each other by two connectors 30. The first bottom tube 12 has a first net portion 13 connected thereto. The first net portion 13 of the first part 10 includes an upward inclined section. Each connector 30 has two passages 31 respectively defined in two ends thereof, and the first top tube 11 and the first bottom tube 12 are inserted into the passages 31. Two first extension tubes 14 are respectively inserted into the two passages 31 of each of the connectors 30 and are respectively connected to the first top tube 11 and the first bottom tube 12 corresponding thereto.

A second part 20 has a second top tube 21 and a second bottom tube 22, and each of the second top tube 21 and the second bottom tube 22 is a U-shaped tube. The second top tube 21 and the second bottom tube 22 are connected to each other by two connectors 30. The second bottom tube 22 has a second net portion 23 connected thereto. The second net portion 23 of the second part 20 includes an upward inclined section.

Each of the connectors 30 has a passage 31 defined in each of two ends thereof The second top tube 21 and the second bottom tube 22 are inserted into the passages 31 of each of the connectors 30 of the second part 20. Two second extension tubes 24 are inserted into the two passages 31 of each of the two connectors 30 of the second part 20 and are respectively connected to the second top tube 21 and the second bottom tube 22 corresponding thereto. The first part 10 and the second part 20 are connected to each other by connecting the respective first and second extension tubes 14, 24 to each other at the two connectors 30 that are located between the first part 10 and the second part 20.

Specifically, the first extension tubes 14 are respectively connected to the first top tube 11 and the first bottom tube 12 in the connector 30 of the first part 10 by extending a bolt 50 through the connector 30 and first extension tubes 14 and the first top/bottom tube 11/12, and the bolt 50 is connected with a nut 52. Preferably, each of the connectors 30 includes a resilient member 35 which is located between the first/second extension tubes 14/24 and the inside of the connector 30 to combine the connector 30 and the first/second extension tubes 14/24 together. Besides, each of the first and second extension tubes 14, 24 has a first/second decorative member 142/242 connected thereto for aesthetic purposes.

Figure 4:
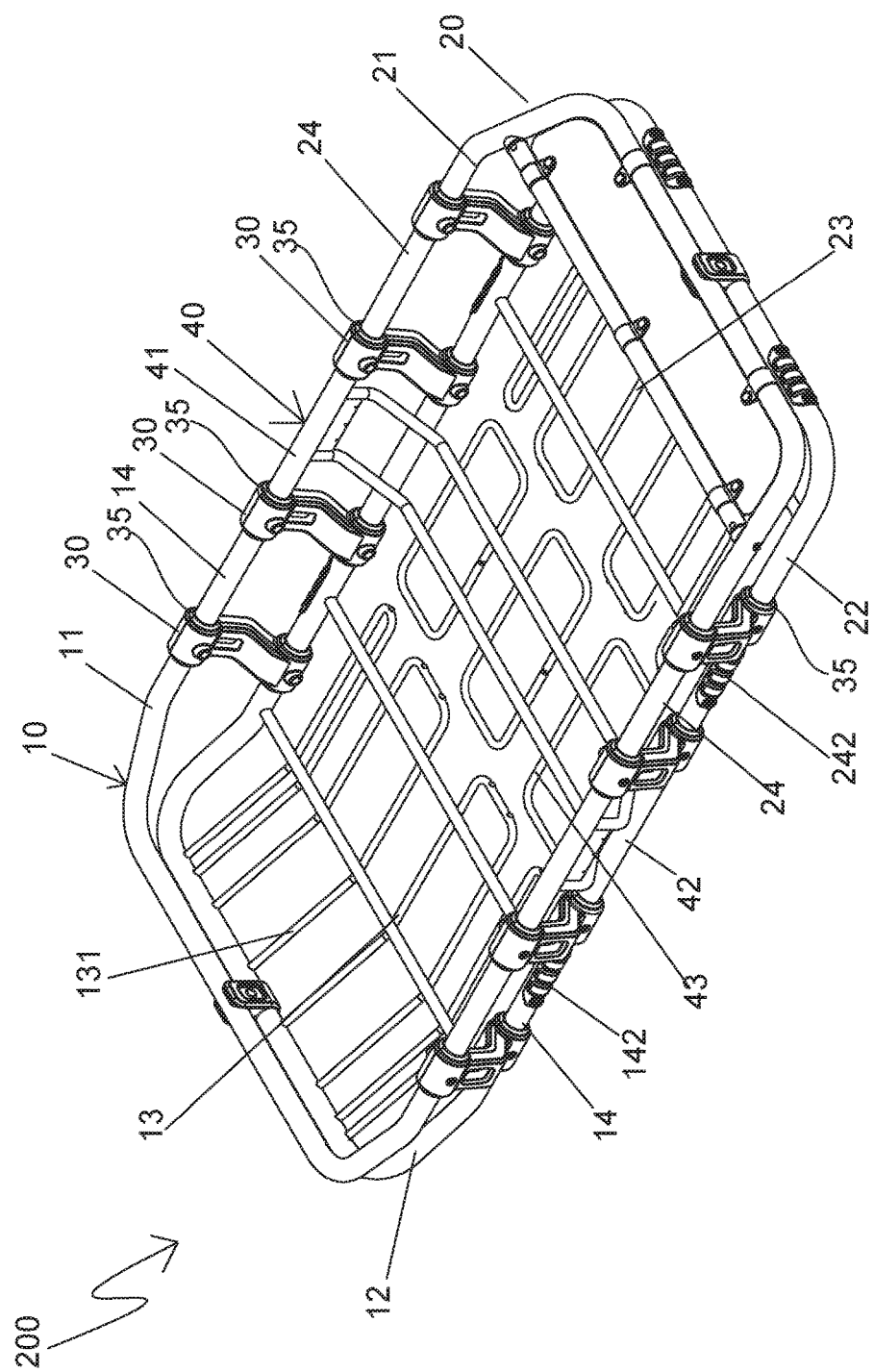
FIG. 4 is a perspective view to show the second embodiment of the luggage tray of the present invention.
Figure 5:
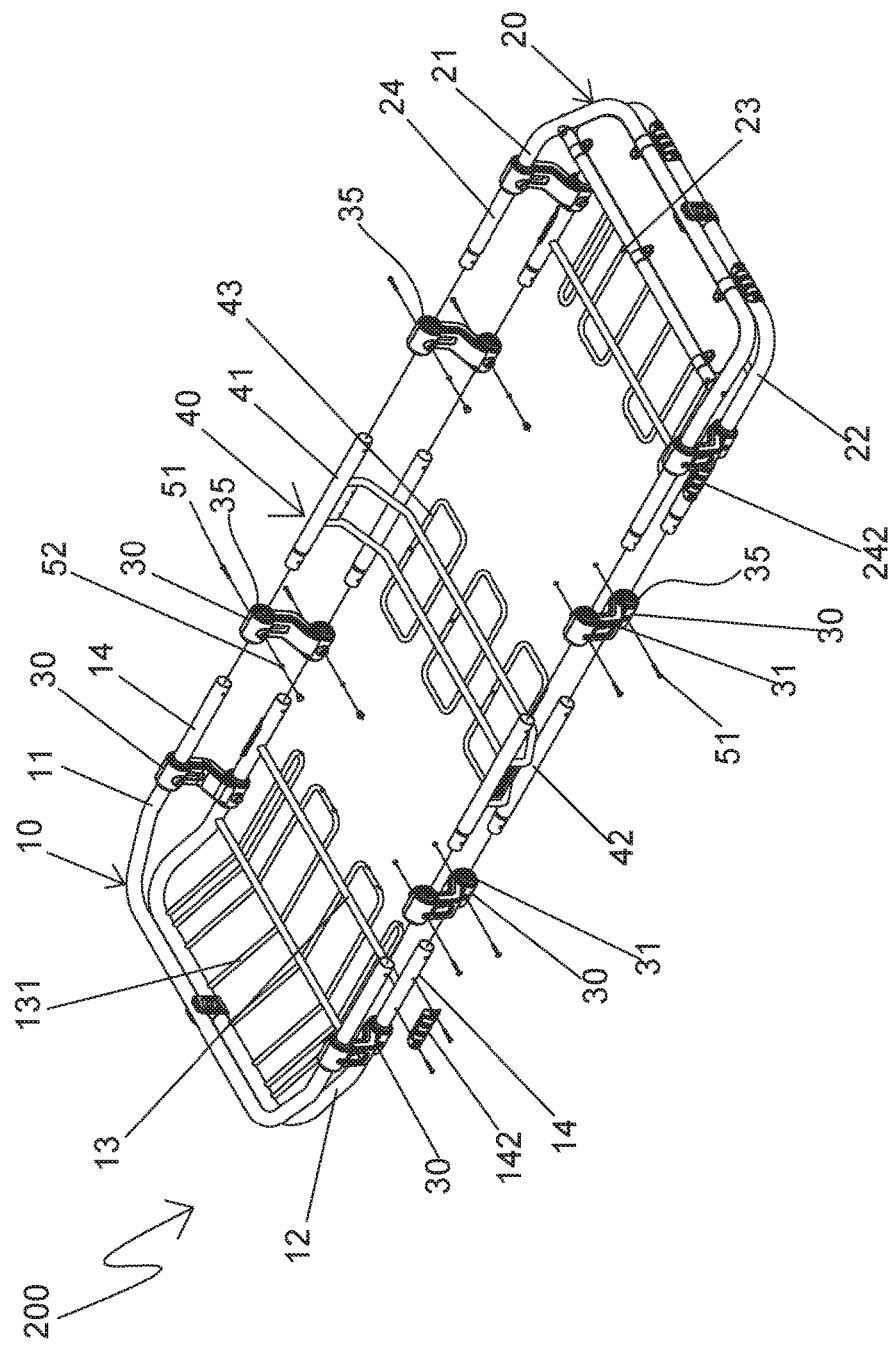
FIG. 5 is an exploded view to show the second embodiment of the luggage tray of the present invention.
Figure 6:
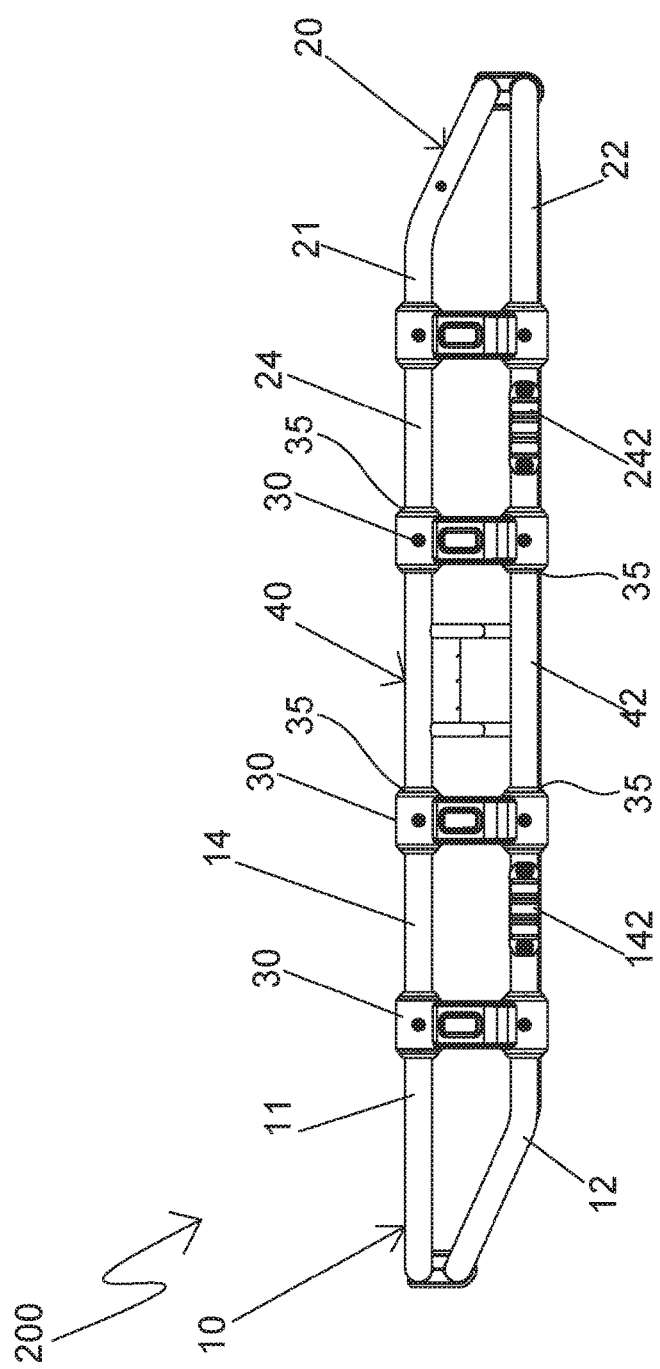
FIG. 6 is a side view to show the second embodiment of the luggage tray of the present invention.

Referring to FIGS. 4 to 6, the second embodiment 200 is disclosed, wherein the first prat 10 and the second part 20 are identical to those in the first embodiment 100. The difference between the second embodiment 200 and the first embodiment 100 is an intermediate part 40 is connected between the first and second parts 10, 20, so that the size of the luggage tray is increased. The intermediate part 40 includes a third top tube 41 and a third bottom tube 42. The third bottom tube 42 has a third net portion 43. The third top and bottom tubes 41, 42 are connected to the first and second extension tubes 14, 24 by at least one connector 30 located therebetween by the same way as described to any of the connectors 30 with the tubes.

The resilient member 35 is located between the connector 30, the first and second extension tubes 14, 24, so that the connector 30, the first and second extension tubes 14, 24 can be snugly combined with each other. Besides, the resilient member 35 provides buffering feature to avoid from hit and damage to the connector 30, the first and second extension tubes 14, 24.

While we have shown and described the embodiment in accordance with the present invention, it should be clear to those skilled in the art that further embodiments may be made without departing from the scope of the present invention.

What is claimed is:

1. A luggage tray comprising:
a first part having a first top tube and a first bottom tube, each of the first top tube and the first bottom tube being a U-shaped tube, the first top tube and the first bottom tube being connected to each other by at least one connector, the first bottom tube having a first net portion connected thereto, the at least one connector having passages defined in two ends thereof, the first top tube and the first bottom tube inserted into the passages, two first extension tubes respectively inserted into the two passages of the at least one connector a bolt extending through the at least one connector, the first extension tubes and the first top/bottom tube so as to connect the first extension tubes with the first top tube and the first bottom tube in the at least one connector;
a second part having a second top tube and a second bottom tube, each of the second top tube and the second bottom tube being a U-shaped tube, the second top tube and the second bottom tube being connected to each other by at least one connector, the second bottom tube having a second net portion connected thereto, the at least one connector having two passages respectively defined in two ends thereof, the second top tube and the second bottom tube inserted into the passages of the at least one connector of the second part, two second extension tubes inserted into the two passages of the at least one connector of the second part and respectively connected to the second top tube and the second bottom tube, and
the first part and the second part connected to each other by connecting the respective first and second extension tubes to each other by at least one connector that is located between the first part and the second part.

2. The luggage tray as claimed in claim 1, wherein each of the at least one connectors includes a resilient member which is located between the first/second extension tubes and an inside of the at least one connector to combine the at least one connectors and the first/second extension tubes together.

3. The luggage tray as claimed in claim 1, wherein each of the first and second extension tubes has a first/second decorative member connected thereto.

4. The luggage tray as claimed in claim 1, wherein the first net portion of the first part includes an upward inclined section.

\* \* \* \* \*